United States Patent [19]

Kester et al.

[11] Patent Number: 5,003,771
[45] Date of Patent: Apr. 2, 1991

[54] FUEL DISTRIBUTION VALVE FOR A COMBUSTION CHAMBER

[75] Inventors: Jervis D. Kester, Farmington; Clarence P. Redington, Glastonbury, both of Conn.

[73] Assignee: United Technologies Corporation, Hartford, Conn.

[21] Appl. No.: 257,490

[22] Filed: Oct. 13, 1988

[51] Int. Cl.$^5$ .......................... F02C 7/264; F02C 9/34
[52] U.S. Cl. .................... 60/243; 60/39.141; 60/741
[58] Field of Search ............ 60/243, 739, 741, 746, 60/39.141; 137/118, 625.37

[56] References Cited

U.S. PATENT DOCUMENTS

| | | | |
|---|---|---|---|
| 2,536,440 | 1/1951 | Greenland | 137/118 |
| 2,664,910 | 1/1954 | Boyd et al. | 137/118 |
| 2,692,797 | 10/1954 | Wood et al. | 137/118 |
| 2,700,394 | 1/1955 | Jay | 137/118 |
| 2,757,961 | 8/1956 | Nims | 60/739 |
| 2,963,082 | 12/1960 | Binford et al. | |
| 2,993,338 | 7/1961 | Wilsted | |
| 3,197,958 | 8/1965 | Davies | |
| 3,360,199 | 12/1967 | Sharpe | 137/118 |
| 3,590,839 | 7/1971 | Moore | 137/71 |
| 4,027,473 | 6/1977 | Baker | 60/243 |
| 4,062,183 | 12/1977 | Davies et al. | 60/39.09 |
| 4,226,365 | 10/1980 | Norris et al. | 239/66 |
| 4,337,616 | 7/1982 | Downing | 60/39.281 |
| 4,614,202 | 9/1986 | Halvorsen et al. | 137/118 |
| 4,632,361 | 12/1986 | Callison | 251/230 |
| 4,708,371 | 11/1987 | Elsworth et al. | 285/13 |
| 4,720,971 | 1/1988 | DuBell | 60/204 |
| 4,742,685 | 5/1988 | Halvorsen et al. | 60/739 |

Primary Examiner—Louis J. Casaregola
Assistant Examiner—Timothy S. Thorpe
Attorney, Agent, or Firm—Gene D. Fleischhauer

[57] ABSTRACT

A fuel distribution valve 16 for a gas turbine engine is disclosed. Various construction details are developed which improve the ability of the combustion chamber 12 to avoid blowouts of the combustion chamber. In one particular embodiment, the fuel distribution valve has ports 38 for controlling the fuel flow to fuel nozzles 14 in the combustion chamber. The ports provide equal flow area at high engine power, high aircraft Mach number (greater than 0.8M) operation while providing unequal flow areas at certain preselected low power operative conditions of the engine which follow the high power operative condition.

14 Claims, 3 Drawing Sheets

FUEL DISTRIBUTION VALVE FOR A COMBUSTION CHAMBER

TECHNICAL FIELD

This invention relates to axial flow rotary machines which have an annular combustion chamber, a plurality of fuel nozzles disposed in the annular combustion chamber and a fuel distribution valve for distributing fuel to the nozzles. This invention has application to other fields in which combustion chambers having multiple fuel nozzles are employed.

BACKGROUND ART

One example of an axial flow rotary machine using an annular combustion chamber is a gas turbine engine for powering an aircraft. A flow path for working medium gases, typically air, extends axially through a compression section, a combustion section and a turbine section. The combustion section includes a combustion chamber. A plurality of nozzles are disposed in the combustion chamber for spraying fuel into the working medium flow path. The fuel is ignited and burned with oxygen in the working medium gases to add energy to the working medium gases.

The fuel system typically includes a source of pressurized fuel, such as fuel supplied from a fuel tank via a fuel control. The fuel control is responsive to power settings of the engine to vary the flow rate of fuel to the engine. A fuel distribution valve receives fuel from the fuel control and distributes the fuel via manifolds to the fuel nozzles in the combustion chamber. One example of such a fuel distribution valve is the fuel distribution valve used in the PW-4000 engine manufactured by the Pratt and Whitney Group, an operating unit of the Assignee of this invention. The fuel distribution valve for the PW-4000 engine includes a casing having a plurality of ports extending through the casing and a piston movable with respect to the ports for uncovering more or less area of the port in response to the flow rate of fuel.

Each port has the same amount of flow area for a given location of the piston to distribute an equal amount of fuel to the fuel nozzles in the combustion chamber. This provides uniform combustion within the combustion chamber and avoids localized high temperature regions in the chamber. These high temperature regions could cause overheating of components of the engine such as the turbine, which are downstream of the combustion chamber.

One of the problems encountered during operation of a gas turbine engine is that, at low fuel flow, the burning gases in the combustion chamber may blow out either as a result of high velocities of the working medium gases (primarily air) in the annular combustion chamber, low pressures or temperatures in the combustion chamber, a lean fuel/air ratio or combinations of these conditions which are aggravated by transient operation of the engine. As will be realized, a blowout of the combustion chamber will result in a loss of power from the engine and is a condition to be avoided.

Accordingly, scientists and engineers working under the direction of Applicants' Assignee have sought to improve the ability of the fuel supply system to resist a blowout of the combustion chamber during operative conditions of the engine.

DISCLOSURE OF INVENTION

This invention is in part predicated on the recognition that as the gas turbine engine is decelerated from a higher power condition, such as cruise power, to a lower power condition, such as an idle descent power, a momentary underfueling of the combustion chamber may take place. The underfueling of the combustion chamber occurs because the fuel flow to the combustion chamber decreases at a faster rate than the airflow through the combustion chamber. The condition is aggravated by reduced pressures in the combustion chamber. Thus, the transient mismatch in fuel and air flow rates may result in a fuel/air ratio in the combustion chamber that is too lean to support combustion.

According to the present invention, a fuel distribution valve for providing fuel to a plurality of fuel nozzles in a combustion chamber includes a plurality of ports uncovered by a piston, at least one of the ports having a larger flow area than the remainder of the ports to provide a fuel rich region of the combustion chamber which acts as a pilot light to the combustion chamber.

In accordance with one particular embodiment of the present invention, the flow areas of the ports are equal at operative powers of the engine at which blowout is not considered a problem, such as sea level takeoff or other higher power operative conditions of the engine.

A method of operating the engine includes the steps of flowing fuel through a fuel distribution valve having ports sized such that at least one port provides increased flow in comparison to the fuel flow through the remaining ports to provide a fuel rich region of the combustion chamber at low power operative conditions of the engine.

A primary feature of the present invention is a fuel distribution valve having an inlet passage and a plurality of outlet passages. The valve includes a wall having a plurality of ports. Each port places the inlet passage in flow communication with an associated outlet passage. A piston is slidable with respect to the wall to uncover each port from one end of the port to the piston to vary the flow area of the port. The plurality of ports includes at least one port which has an increased flow area in comparison to the flow area of other ports at the same piston position. In accordance with one embodiment of the present invention, the port having an increased flow area at the first piston position has a reduced flow area between the first piston position and a second piston position such that the total flow area of the first port is equal to the flow area of the remaining ports.

A primary advantage of the present invention is the ability of the combustion chamber to sustain combustion under operative conditions of the engine which may cause blowout of the combustion chamber. This results from having two different local fuel/air ratios in the combustion chamber with the fuel rich region providing pilot light to the fuel lean regions of the combustion chamber. Another advantage of one embodiment of the present invention is the efficiency of the engine which results from equalizing the flow areas of all ports at high power operative conditions of the engine while providing acceptably lean fuel/air ratios at low power operation. Still another advantage is the ability to provide local fuel/air ratios which may be tailored over the production life of a series of engines by simply changing the port configuration in the fuel distribution nozzle.

The foregoing features and advantages of the present invention will become more apparent in light of the following detailed description of the best mode of carrying out the invention and the accompanying drawing.

BEST MODE FOR CARRYING OUT THE INVENTION

Figure 1:
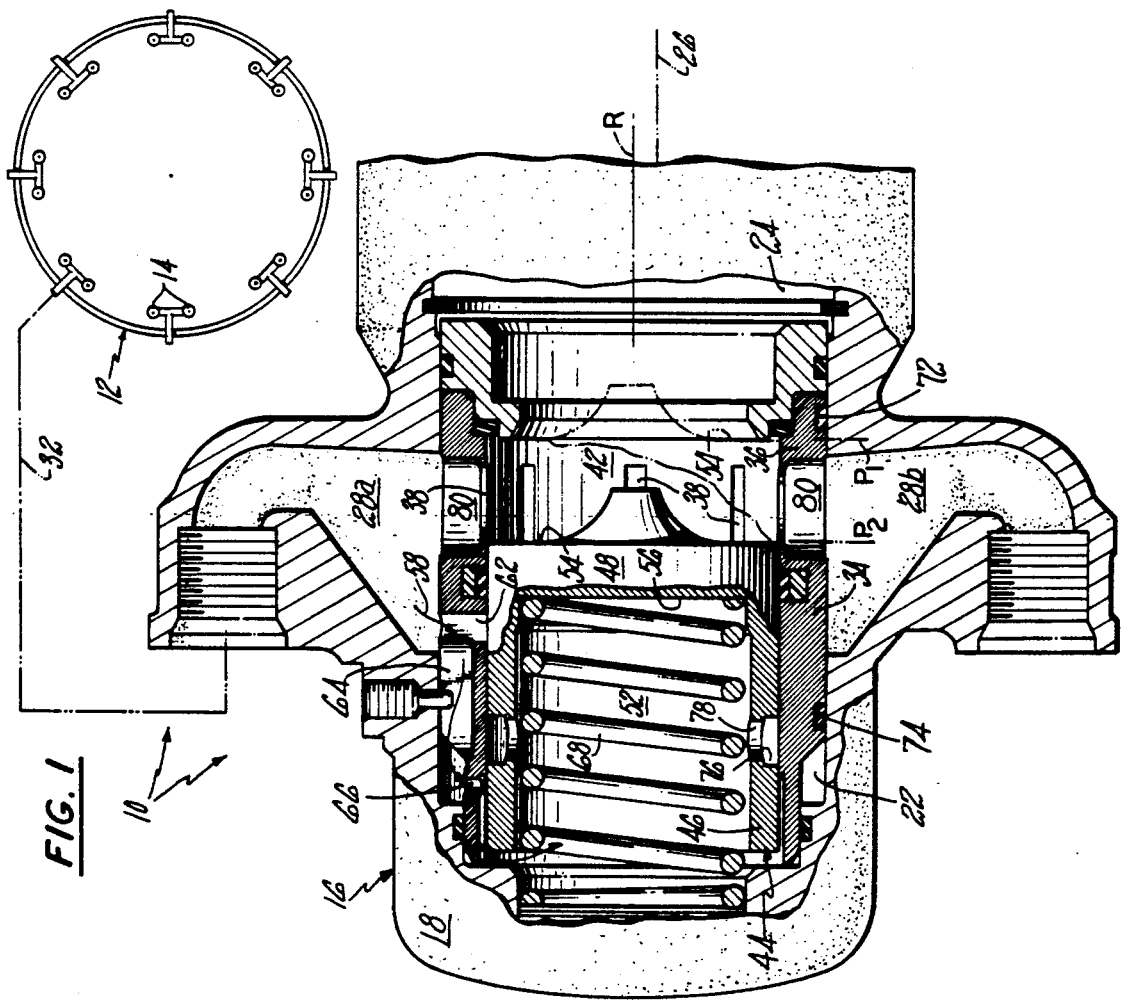
FIG. 1 is a view partly in schematic showing a combustion chamber having pairs of fuel nozzles disposed therein and is partly a cross-sectional view of a fuel distribution valve connected to the fuel nozzles with portions of the valve broken away for clarity to show a piston in the valve in the open and closed positions.

FIG. 1 is a view of a portion of the combustion section 10 of a gas turbine engine embodiment of the present invention. The view is partly in schematic showing a combustion chamber 12 for a gas turbine engine and a plurality of fuel nozzles 14 disposed in the combustion chamber.

As shown in a cross-sectional view which is partly broken away, the combustion section 10 of the engine also includes a fuel distribution valve 16. The fuel distribution valve includes a housing 18 having a chamber 22 disposed about an axis R and an inlet passage 24. The inlet passage is connected via a fuel supply line 26 to a fuel control (not shown).

The housing 18 has a plurality of outlet passages, as represented by the passages 28a, 28b, which are in flow communication via the chamber 22 with the inlet passage 24. Each outlet passage is connected via a manifold, as represented by the manifold 32, to a pair of fuel nozzles 14.

The fuel distribution valve 16 includes a cylindrical casing or sleeve 34 disposed in the chamber 22 of the housing. The cylindrical sleeve extends about the axis R of the housing. The cylindrical sleeve has a wall 36 having a plurality of ports 38 extending through the wall. The sleeve has an inlet passage 42 in flow communication with the inlet passage 24 of the housing. Each port places an associated outlet passage 28 in the housing in flow communication with the inlet passage.

The fuel distribution valve includes a piston 44 disposed in the sleeve. The piston is slidable in a direction, such as the axial direction, with respect to the sleeve wall 36 and to the ports 38. The piston has a circumferentially extending wall 46 and an end 48 which bound a chamber 52 on the interior of the piston. The end has a first reaction face 54 which adapts the piston to receive a pressure force from pressurized fuel on the interior of the sleeve in the inlet passage.

The piston 44 has a second or opposing reaction face 56 which bounds the chamber 52 in the piston. A path 58 for fuel extends from the outlet passage 28 to the piston chamber 52 to provide a reference pressure to the chamber. The path extends from the outlet passage to a circumferential drain hole 62 in the sleeve. The drain hole is connected via an axial slot 64 in the sleeve to a hole 66 in the piston which extends to the chamber within the piston. A spring 68 is also disposed between the second reaction face and the housing to exert a spring force on the piston.

A seal groove 72 and a seal 74 extend circumferentially about ports 38 which do not supply the reference pressure fuel to the piston chamber. The seal extends between the sleeve 34 and the housing 18 to block fluid communication between the ports. The seal also channels flow to drain holes 62 adjacent to five of the ports.

As shown by the broken line in FIG. 1, the piston 44 has a first position $P_1$ with respect to the wall 36 of the sleeve at which the wall 46 of the piston entirely covers the ports 38, interrupting flow from the inlet 42 of the sleeve through the ports to the outlet chambers 28. In the closed position, a drain groove 76, which extends circumferentially in the wall of the piston, is aligned with drain holes 62 at all but two of the ports. The drain holes in the sleeve allow the manifolds 32 at engine shutdown to drain from the top manifolds to the bottom manifolds via a corresponding hole 78 in the walls of the piston and the chamber. Two of the ports do not have associated drain holes so that the manifolds remain full of fuel to provide a sequential lighting of the combustion chamber as the other manifolds fill during ignition.

As shown in FIG. 1 in full, the piston 44 has a second position $P_2$ with respect to the wall 36 of the sleeve 34 at which a plurality of the ports 38 are uncovered to the maximum extent of uncoverage in the axial direction, that is, the direction of relative movement between the piston and the sleeve. The ports could extend beyond the piston and be blocked by the piston at position $P_2$. Thus, the maximum extent of uncoverage would be less than the full length of the port. A retrofitted piston 44 or spring 68 would then alter the position of the piston, permitting increased flow area through the port without changing the sleeve.

As will be realized, in alternate constructions the piston 44 might be fixed and the sleeve 34 slidable with respect to the piston or the piston might be disposed circumferentially about the sleeve.

Figure 2:
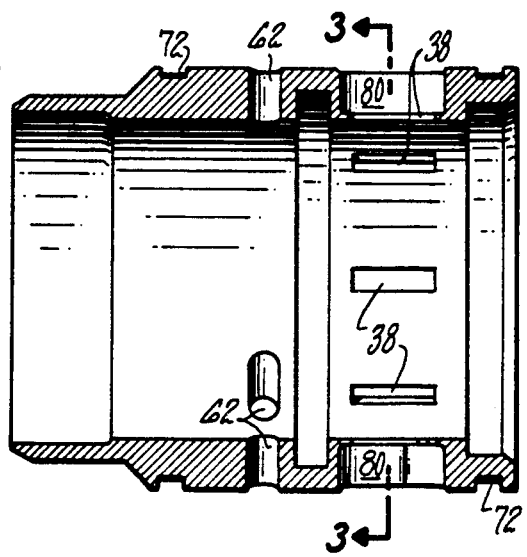
FIG. 2 is a cross-sectional view of a sleeve of the fuel distribution valve shown in FIG. 1.

FIG. 2 is a cross-sectional view of the sleeve 34 shown in FIG. 1 showing the relationship of the drain holes 62 through the sleeve to the ports 38 in the sleeve. An opening 80 extends from each port to the associated outlet passage. The seal groove 72 extends circumferentially about the exterior of the sleeve and, as shown in FIG. 3, extends axially along the sleeve.

Figure 3:
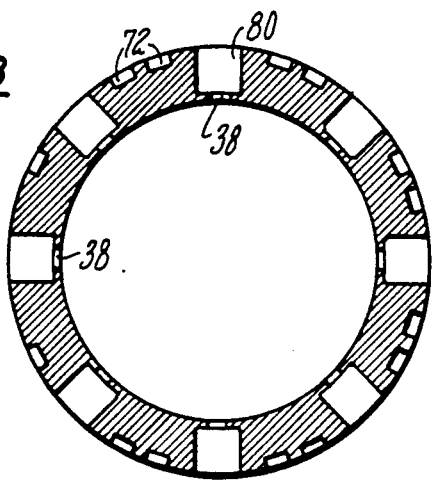
FIG. 3 is a cross-sectional view taken along the line 3—3 of FIG. 2.

FIG. 3 is a cross-sectional view taken along the line 3—3 of FIG. 2 showing the ports 38 and the associated opening 80 through the sleeve 36 which places the ports in flow communication with the outlet passage 28. As mentioned, the seal groove 72 for receiving the seal 74 extends about all but one of the ports to block fluid communication between the ports. The remaining port has no seal and provides the flow via the path 58 to the interior chamber 52 of the piston to provide the reference pressure to the piston.

Figure 4:
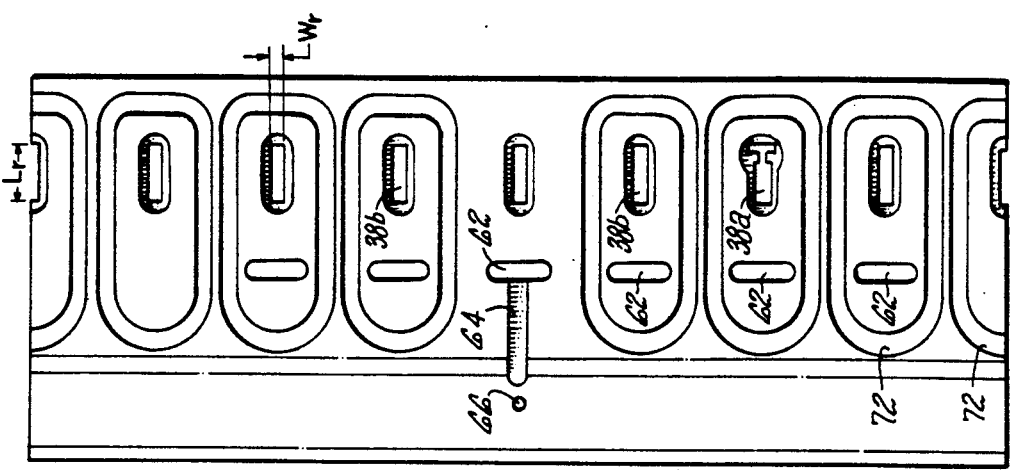
FIG. 4 is a developed view of the sleeve shown in FIG. 2 showing the relationship of the ports of the sleeve to each other.

FIG. 4 is a developed view of the sleeve 36 shown in FIG. 3 showing the relationship of the seal to the ports 38 and drain holes 62 and the relationship of the ports to each other. The plurality of ports includes at least one first port 38a. The remainder of the plurality of ports forms a group of second ports 38b. Each second port has a substantially rectangular shape having a length $L_r$ and a width $W_r$. Each first port has a width which varies over the length of the port as is shown in FIG. 5.

Figure 5:
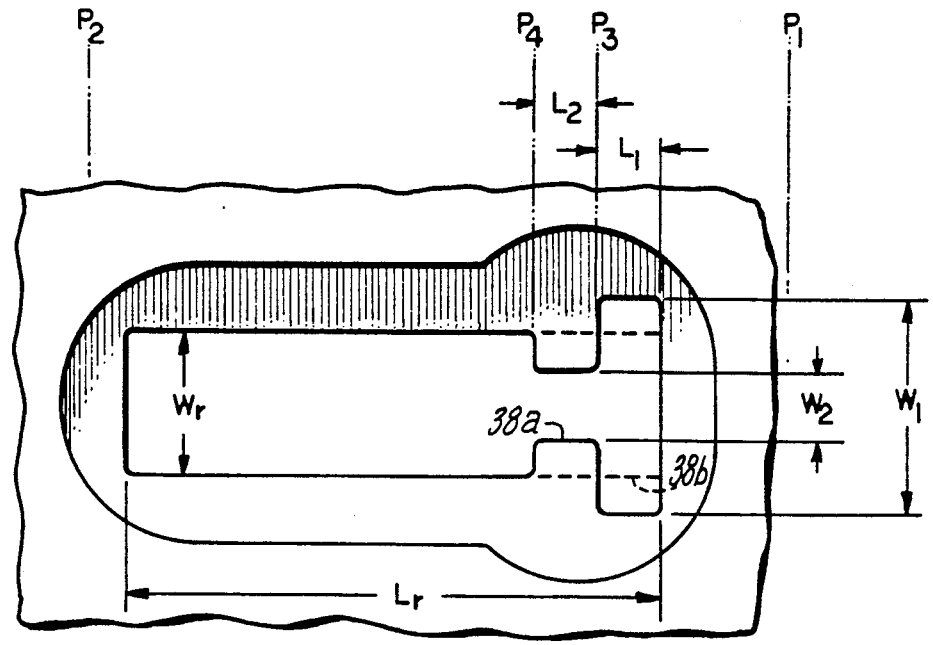
FIG. 5 is an enlarged view of a first port (shown in full) of FIG. 4 superimposed on a second port (shown by broken lines) of FIG. 4. The positions of the piston with respect to the ports is shown in phantom.
Figure 6:
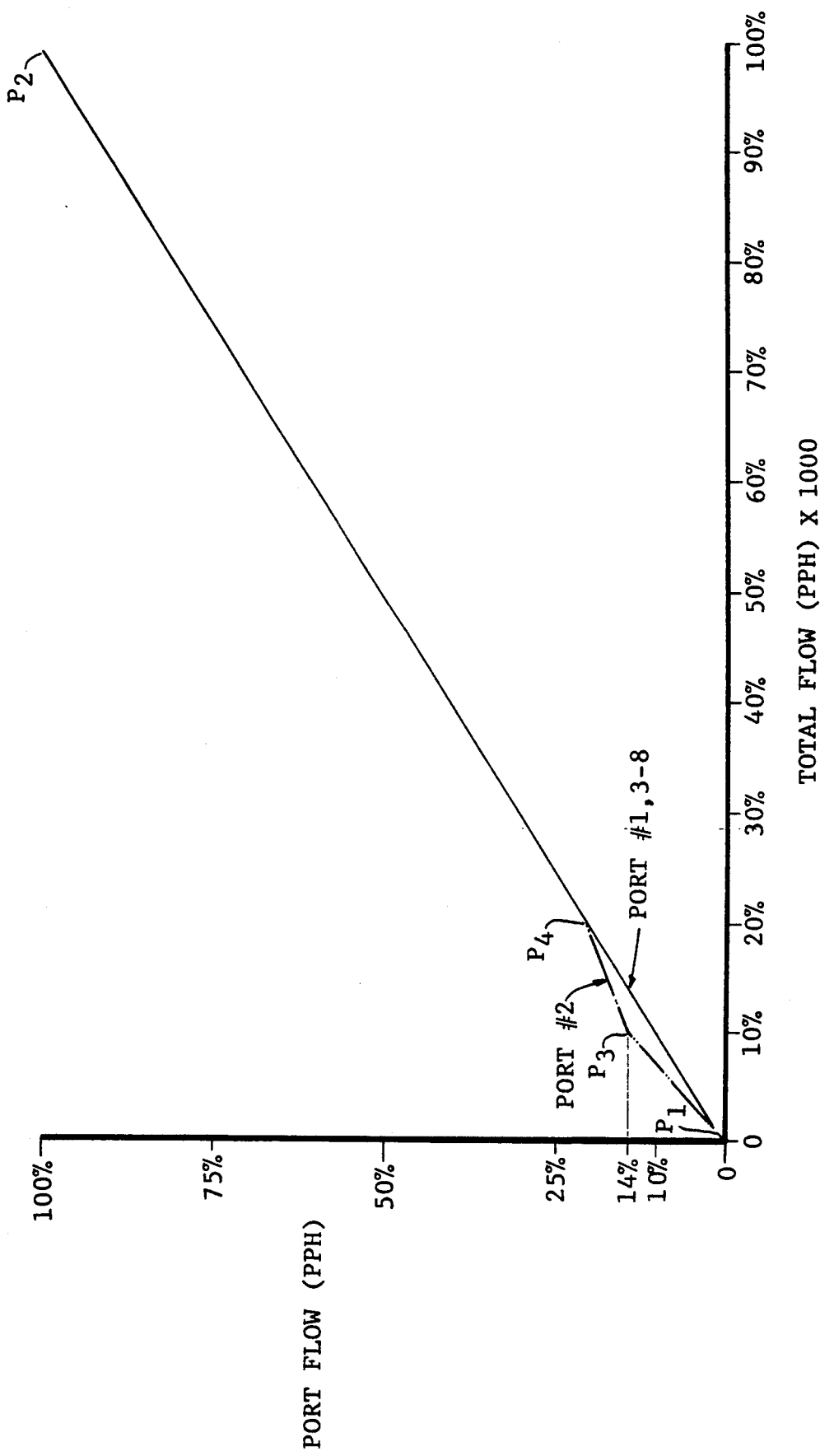
FIG. 6 is a graphical representation of fuel flow through each port as a percentage of the average total flow through each port versus percent total flow through all ports.

FIG. 5 is a partly schematic enlarged view of the first port 38a. The first port is superimposed over one of the second ports 38b which is shown by dotted lines. Both the first and second ports have an overall length $L_r$. The second port has a width $W_r$ which is unvarying over the length of the port.

The first port 38a has a width $W_1$ over a first length $L_1$ which is greater than the width $W_r$. As a result, the first port has a greater flow area with the piston at the third position (shown by the phantom line marked $P_3$). The first port has a width $W_2$ which is smaller than the width $W_r$ over a second length $L_2$ such that the area of the first port over the length $L_1$ and $L_2$ is approximately equal to the area of the second port over the length $L_1$ and $L_2$. As shown, the areas of port 38b are rectangular but they could be of other shapes. The areas are approximately equal if the flow through the first port and the second port (with the piston at position $P_4$ where it uncovers the lengths $L_1$ and $L_2$) are within one percent of the average total flow through the ports at the maximum flow condition. As a result, with the piston at position $P_4$, the flow through the first port and the flow through the second port should be equal and the flow should be equal for any piston position between position $P_4$ and position $P_2$.

During operation of the gas turbine engine, the pressure and volume of the flow of fuel to the fuel distribution valve 16 at a high powered condition, such as occurs at certain cruise conditions and sea level takeoff, forces the piston to position $P_2$. At position $P_2$, the ports are uncovered to their maximum extent to allow equal fuel flow to all fuel nozzles 14 of the engine. As fuel flow is decreased to a lower, preselected level, the pressure acting on the face 54 of the piston decreases causing the piston 44 to move to position $P_4$ at which the fuel flow is still equal by reason of the equalized areas of the first port 38a and the second ports 38b. As the piston moves into the idle power region, such as might occur during descent of the aircraft from cruise altitude, the piston moves to position $P_3$ at which fuel flow through the first port is greater than fuel flow to each of the second ports.

As shown in FIG. 7, the fuel flow through this port is approximately fourteen (14) percent of the average total fuel flow through the port in comparison to the fuel flow through each of the remaining ports which is approximately ten (10) percent of the average total fuel flow through the ports. This causes the region of the combustion chamber near the fuel nozzles supplied by the first port to run at a much richer local fuel/air ratio than the regions of the nozzle supplied by the second ports which run at a leaner fuel/air ratio. This results in two different local fuel/air ratios with each of the fuel/air ratios interacting on the transient velocities, pressures, temperatures, and other conditions of the combustion chamber. The richer fuel/air ratio region provides a pilot light to maintain combustion in the combustion chamber and avoid blowouts should a blowout occur in the other regions of the combustion chamber by reason of the fuel/air ratio being too lean. The flight regime where the combustion chamber is most vulnerable to blowouts is generally where the aircraft is in a decelerating operative condition from high Mach number, low altitude operation. Thus, the ability of the fuel system to avoid a blowout in the burner is enhanced during unusual transient conditions while still permitting the fuel system to operate in an economically and environmentally sound manner.

As the piston moves from position $P_3$ to $P_4$, the port is configured to protect the turbine against high temperature associated with local maximum fuel/air ratios as the enriched fuel/air ratio is phased out with increased power of the aircraft.

As will be realized, it is a relatively simple matter to adjust the fuel/air ratios of the regions of a combustion chamber in a single engine by changing the sleeve of the fuel distributor valve to retrofit a customized port configuration over the life of the engine. For example, as different engines are produced in a model of a particular engine series and changes are made to the newer model engines in the series, it is relatively easy in these different engines to tailor the flow of fuel to different regions of the combustion chamber to accommodate minor design and performance changes in the engines.

Although the invention has been shown and described with respect to detail embodiments thereof, it should be understood by those skilled in the art that various changes in form and detail thereof, may be made without departing from the spirit and the scope of the claimed invention.

We claim:

1. In a valve of the type for distributing fuel in a machine from a source of fuel to a plurality of fuel nozzles in a combustion chamber, the valve including an inlet passage and a plurality of outlet passages for fuel, a wall having a plurality of ports which extend in a first direction and through the wall for placing the inlet passage in flow communication with each outlet passage and including a piston which is slidable in the first direction with respect to the wall, the piston having a first position with respect to the wall at which the piston covers the ports, a second position at which a plurality of the ports are uncovered to the maximum extent of uncoverage in the first direction and a third position between the first position and the second position at which each port is partially covered leaving at least a portion of the port uncovered over the entire distance of the port between the first position and the third position, the improvement which comprises:

a plurality of ports which includes at least one first port and more than one second port, the plurality of ports being uncovered at said third position with each port having an uncovered area, each first port having an uncovered area $A_3$ which is greater than the uncovered area $A_{r3}$ of each of the second ports to provide a greater fuel flow through said area $A_3$ and thence to a region of the combustion chamber to provide a fuel rich region of the combustion chamber in comparison to other regions of the combustion chamber in flow communication with said source of fuel through said ports having an area $A_{r3}$.

2. The fuel distribution valve of claim 1 wherein the piston is movable to a fourth position at which each first port has an uncovered area $A_4$ which is equal to the uncovered area $A_{r4}$ of each of the second ports.

3. The fuel distribution valve of claim 1 wherein the piston is disposed inwardly of said circumferentially extending wall.

4. In a valve of the type for distributing fuel in a gas turbine engine from a fuel control to a plurality of fuel nozzles in a combustion chamber, the valve including a housing having an inlet passage and a plurality of outlet passages for fuel, the valve including a casing having a wall extending circumferentially about an axis, the wall having a plurality of axially extending ports extending therethrough for placing the inlet passage in flow communication with each outlet passage and, the valve including a piston which is slidable axially with respect to the wall, the piston having a first position with respect to the wall at which the piston covers the ports, a second position at which a plurality of the ports are uncovered to the maximum extent of uncoverage in the axial direction and a third position between the first position and the second position at which each port is partially covered leaving at least a portion of the port uncovered over the entire distance of the port between the first position and the third position, the improvement which comprises:

a plurality of ports which includes at least one first port and more than one second port, the plurality of ports being uncovered at said third position with each port having an uncovered area A, at least one of said ports being a first port having an uncovered area $A_3$ which is greater than the uncovered area $A_{r3}$ of each of the second ports to provide a greater fuel flow through said area $A_3$ and thence to a region of the combustor to provide a fuel rich region of the combustor in comparison to other regions of the combustor in flow communication with said source of fuel through said parts having an area $A_{r3}$.

5. The fuel distribution valve of claim 4 wherein the piston is movable to a fourth position at which each first port has an uncovered area $A_4$ which is equal to the uncovered area $A_{r4}$ of each of the second ports.

6. The fuel distribution valve of claim 5 wherein said piston bounds a chamber and wherein a second inlet places said chamber in flow communication with a source of pressurized fuel to provide a reference pressure to the chamber, wherein said piston has a first reaction face and a second opposing reaction face, and wherein a spring exerts a spring force against the first face and the reference pressure exerts a pressure force against the first face and wherein fuel supplied to the inlet passage of the valve exerts an opposing force against the second face, the opposing forces positioning said piston with respect to said ports.

7. The fuel distribution valve of claim 4 wherein each second port extends axially and has a width $W_r$ and wherein each first port has a width $W_1$ over a first length $L_1$ which is greater than the width of $W_r$ and a width $W_2$ which is smaller than the width $W_r$ over a second length $L_2$ such that the area of the first port over the length $L_1$ and $L_2$ is approximately equal to the area of the second port over the length $L_1$ and $L_2$.

8. The fuel distribution valve of claim 7 wherein the first port has a first rectangular shape over the length $L_1$, a second rectangular shape over the length $L_2$ and a third rectangular shape over the remainder of the length of the port.

9. The fuel distribution valve of claim 4 wherein the gas turbine engine is operative at a fuel flow corresponding to cruise power of the engine and operative at a fuel flow corresponding to idle power of the engine which fuel flow is less than the fuel flow at cruise power and wherein the piston and wall are at the third position at an idle power fuel flow.

10. The fuel distribution valve of claim 5 wherein the gas turbine engine is operative at a fuel flow corresponding to cruise power of the engine and operative at a fuel flow corresponding to idle power of the engine which fuel flow is less than the fuel flow at cruise power and wherein the piston and wall are at the third position at an idle power fuel flow.

11. The fuel distribution valve of claim 9 wherein the piston is movable to a fourth position at which each first port has an uncovered area $A_4$ which is equal to the uncovered area $A_{r4}$ of each of the second ports and wherein the piston and wall are at the fourth position at cruise power fuel flows.

12. The fuel distribution valve of claim 10 wherein the piston and wall are at the fourth position at cruise power fuel flows.

13. A fuel distribution valve for distributing fuel in a gas turbine engine from a source of pressurized fuel to a plurality of fuel nozzles in the combustor of a gas turbine engine, which comprises:

a housing having a cylindrical chamber which has an inlet passage, the chamber adapting the housing to receive a casing, the housing having a plurality of outlet passages, each of said outlet passages being in flow communication with at least one fuel nozzle;

a cylindrical casing disposed in said chamber about the axis of the housing, the casing having a plurality of axially extending ports, the plurality of ports including at least one first port and more than one second port, each second port having a substantially rectangular shape having a length $L_R$ and a width $W_r$, each first port having a width $W_1$ over a first length $L_1$ which is greater than the width of $W_r$ and a width $W_2$ which is smaller than the width $W_r$ over a second length $L_2$ such that the area of the first port over the length $L_1$ and $L_2$ is approximately equal to the area of the second port over the length $L_1$ and $L_2$;

a piston which is slidable axially with respect to the wall, the piston having a first position with respect to the wall at which the piston covers the ports, a second position at which a plurality of the ports are uncovered to their maximum extent in the axial direction and a third position between the first position and the second position at which each port is partially covered leaving at least a portion of the port uncovered over the entire distance of the port between the first position and the third position;

wherein the plurality of ports includes at least one first port and more than one second port, the plurality of ports being uncovered at said third position with each port having an uncovered area, each first port having an uncovered area $A_3$ which is greater than the uncovered area $A_{r3}$ of each of the second ports to provide a greater fuel flow through said area $A_3$ and thence to a region of the combustion chamber to provide a fuel rich region of the combustion chamber in comparison to other regions of the combustion chamber in flow communication with said source of fuel through said parts having an area $A_{r3}$.

14. The fuel distribution valve of claim 13 wherein the piston is movable to a fourth position at which each said first port has an uncovered area $A_4$ which is equal to the uncovered area $A_{r4}$ of each of the second ports.

* * * * *